US008826591B2

(12) United States Patent
Shepps

(10) Patent No.: US 8,826,591 B2
(45) Date of Patent: Sep. 9, 2014

(54) MODULAR INTERCONNECTABLE UNITS FOR MACRO PLANTER STRUCTURES

(75) Inventor: Lawrence Shepps, Irvington, NY (US)

(73) Assignee: Plantus, Ltd., Irvington, NY (US)

( * ) Notice: Subject to any disclaimer, the term of this patent is extended or adjusted under 35 U.S.C. 154(b) by 607 days.

(21) Appl. No.: 13/179,898

(22) Filed: Jul. 11, 2011

(65) Prior Publication Data

US 2013/0014436 A1      Jan. 17, 2013

(51) Int. Cl.
*A01G 9/02*      (2006.01)

(52) U.S. Cl.
CPC . *A01G 9/02* (2013.01); *A01G 9/027* (2013.01)
USPC .......................................................... 47/86

(58) Field of Classification Search
CPC ................................ A01G 9/02; A01G 9/028
USPC ................................ 47/65.7, 66.1, 66.6, 86
See application file for complete search history.

(56) References Cited

U.S. PATENT DOCUMENTS

| | | | | |
|---|---|---|---|---|
| 5,870,856 | A * | 2/1999 | Friend | 47/65.7 |
| 6,526,693 | B2 * | 3/2003 | Cochran | 47/66.5 |
| 6,851,221 | B2 * | 2/2005 | Layt et al. | 47/86 |

* cited by examiner

*Primary Examiner* — Monica Williams
(74) *Attorney, Agent, or Firm* — Ladas & Parry LLP

(57) ABSTRACT

Large or macro planter structures for comparatively large plantings for use in large spaces formed from planter modules, which planter structures are assembled on-site with extremely large dimensions, e.g., several hundred feet, to provide unusual and stunning visual effects and which structures include lighted cladding walls which may also function as lighted advertising displays visible from great distances owing to their size.

14 Claims, 12 Drawing Sheets

MODULAR INTERCONNECTABLE UNITS FOR MACRO PLANTER STRUCTURES

BACKGROUND OF THE INVENTION

1. Field of the Invention

The present invention relates generally to new and improved extra large or macro planter structures for comparatively large plantings for use in large spaces, which planter structures may be assembled on-site into very large or macro planters of extremely long lengths, e.g., several hundred feet, to provide unusual and stunning visual effects. The new and improved planter structures include lighted cladding walls which may also function as lighted advertising displays visible from great distances owing to their size. Alternatively, the new and improved elongated planter structures, with or without lighting, may function as highly decorative and attractive barriers for pedestrian and/or vehicular traffic when established on busy streets or walkways.

2. Description of the Related Art

The planter state of the art in general as well as the specific lighted planter art is described in several issued U.S. patents, including: U.S. Pat. No. 3,030,735 to Bodkins; U.S. Pat. No. 3,935,671 to Soot; U.S. Pat. No. 5,741,061 to Lehmann et al.; U.S. Pat. No. 5,951,151 to Carel et al.; D619,924 to Jean-Pierre; and U.S. Pat. No. 7,805,885 to Luckett, as well as several published U.S. patent applications, including: US 2001/0034974 to Cameron et al.; 2003/0140557 to Lyon; 2006/0026898 to Klaus; 2007/0101646 to Licht; 2009/0300984 to Gordon; and 2010/0175318 to Ahmadi. These publications disclose various configurations of small or micro planters, some of which have modularity of components, and some of which disclose systems of illumination. However, there remains a need for macro planter units, which may be arranged and combined into large and striking planter constructions of hundreds of feet in length. The present invention fulfills the need for such large scale units, which may be lighted for special dramatic aesthetic effects.

SUMMARY OF THE PRESENT INVENTION

In accordance with the present invention, a fundamental modular planter unit is formed either off-site or on-site, by erecting a skeletal rectangular parallelpiped frame, cube-shaped or elongated box-shaped, from wooden, thermoplastic, or metal beams and posts. The key elements are open-ended, molded high density polyethylene (HDPE) semi-cylindrical pipes or shells which are mounted to the frames. Decorative cladding in the nature of translucent plastic panels is attached to the frames to complete the modular units. Advantageously, the use of semi-circular pipe reduces the volume and weight of the planter when loaded with planting soil and promotes enhanced root growth of supported plants. Moreover, use of half-pipe reduces by approximately one third the amount of soil which would otherwise be required to fill a rectangular parallelpiped shaped container.

As a further aspect of the invention, the half-pipe shells are of corrugated rib-trough construction, providing added strength by virtue of the ribs as well as discrete spaced fluid reservoirs at the bottom of the troughs. The maximum level or capacity of the reservoirs may be simply established and controlled by drilled or molded drainage ports arranged at predetermined levels and in predetermined numbers at and above the bottom of the shells.

Importantly, the individual modular units are aligned and interconnected with adjacent half-pipe shells coaxially aligned and adjacent external cladding abutted to establish unitary planters of extreme lengths of many hundreds of feet. The attendant visual effects of such macro planters are extraordinary and are further enhanced by the integral internal lighting of the cladding walls in accordance with the invention.

As will be understood, the new macro planter constructions of the invention may be utilized to display advertising as a supplement to their basic functionality as planters. Importantly, the long planters may be used as decorative substitutes for or as alternatives to common concrete traffic barriers.

For a better appreciation of the new and improved modular planter units and the macro planters formed from gauging the units, reference should be made to the following detailed description taken in conjunction with the accompanying drawings.

DETAILED DESCRIPTION OF THE INVENTION

Figure 1:
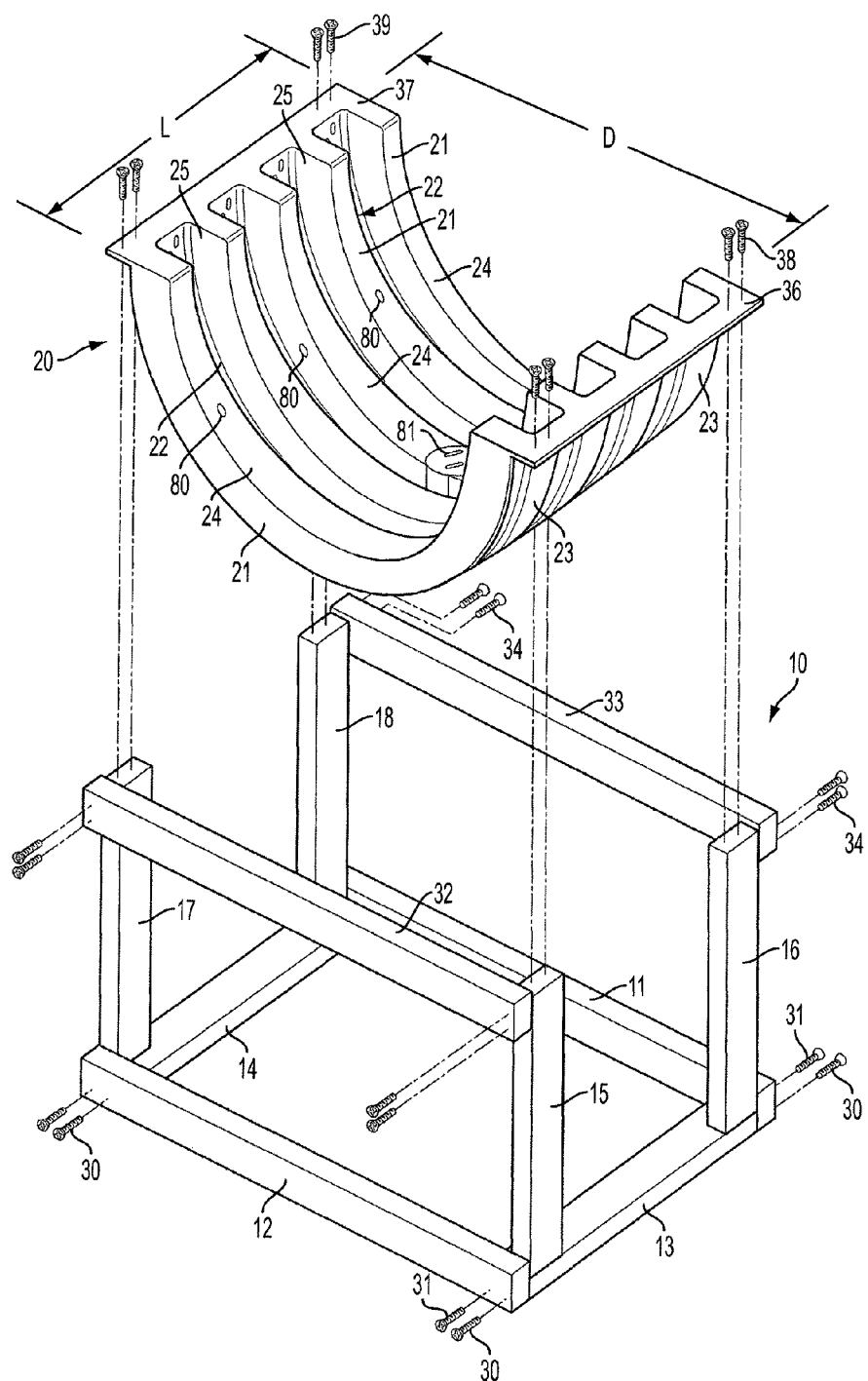
FIG. 1 is an exploded perspective view of a skeletal frame and half-pipe shell elements of the new planter system.

Referring now to FIG. 1, the fundamental components of the new long macro planter structures are modular units comprising an external skeletal rectangular parallelpiped frame 10 and a generally cylindrical half-pipe shell 20 supported directly in the frame 10. As will be understood, the frames and half-pipe shells are adapted to be juxtaposed end-to-end and interconnected to form long continuous planter structures, of hundreds of feet as shown schematically in FIG. 9.

Specifically, the half-pipe shell elements are molded high density polyethylene (HDPE) sized with a diameter D of approximately 32 inches, length of approximately seven feet and depth of approximately 16 inches for easy handling and storage. The dimensions of the shells 20 may of course be varied without departing from the fundamental concepts of the invention. Advantageously, the shells 20 are of corrugated construction having a series of ribs 21 and troughs 22 between adjacent ribs defined by cylindrical outer walls 23, cylindrical inner walls 24, and radial walls 25 extending therebetween (see FIGS. 7, 10, 11, 12, 13). This shape permits the shells to be stacked vertically in a nested relationship when the individual modular planter sections are to be shipped to a site and then erected in situ in the desired extra-long length.

The frames 10 are of simple structure having a straightforward rectangular base of two longitudinal legs 11, 12 joined to two transverse legs 13, 14 by screws 30. Four vertical posts 15, 16, 17, 18 are fastened to the base by screws 31. The frame 10 is completed and reinforced by upper longitudinal members 32, 33 fastened to posts 15, 17 and 16, 18 by screws 34. The legs and posts may be formed of wooden members, rigidified plastic members, or metal members. The posts 15-18 are arranged to both support the individual shells 20 and to permit end-to-end abutment of contiguous frames 10 and shells 20.

Figure 2:
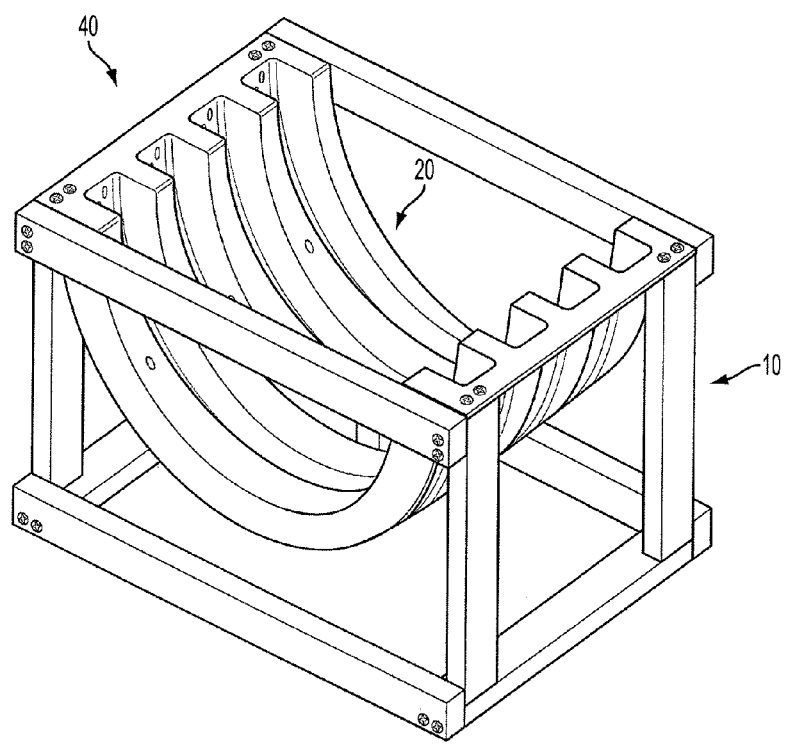
FIG. 2 is a perspective view of an assembled frame and half-pipe of FIG. 1, making a planter.
Figure 3:
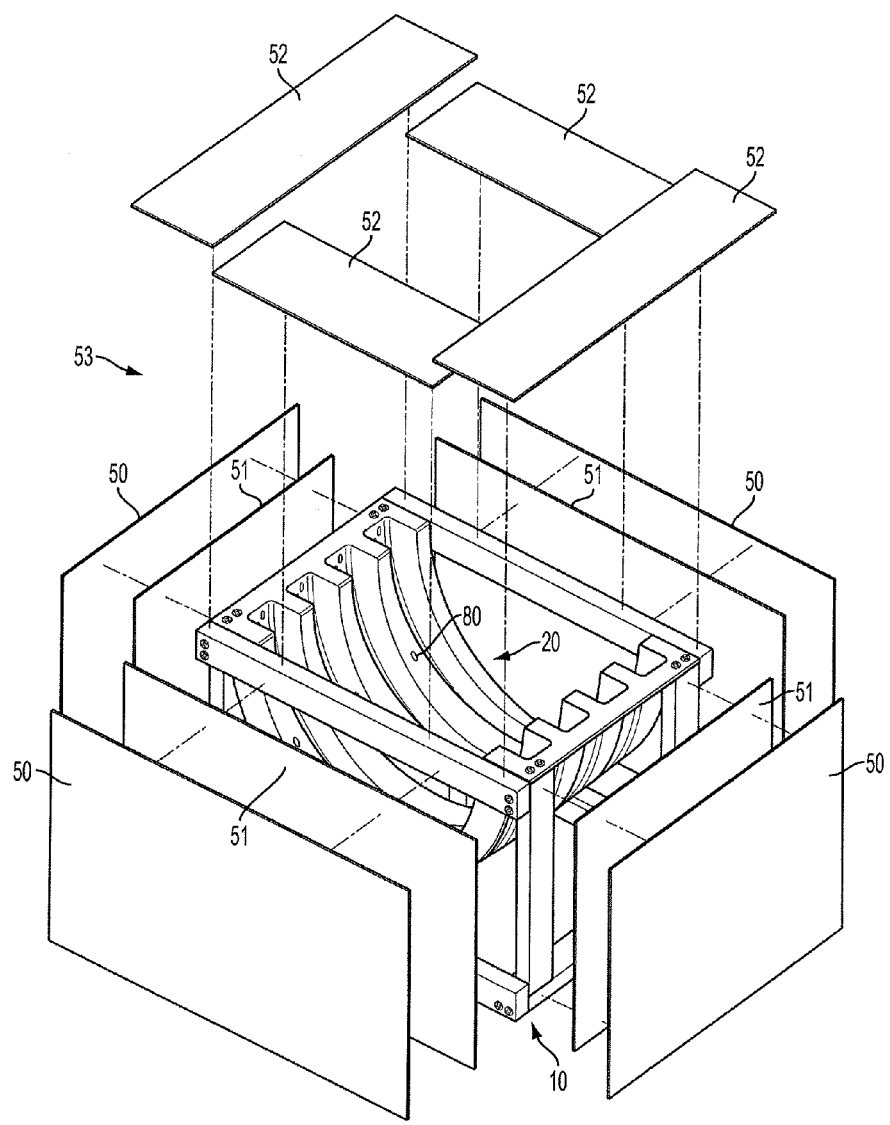
FIG. 3 is an exploded perspective view of the planter of FIG. 1 having spaced cladding walls.
Figure 5:
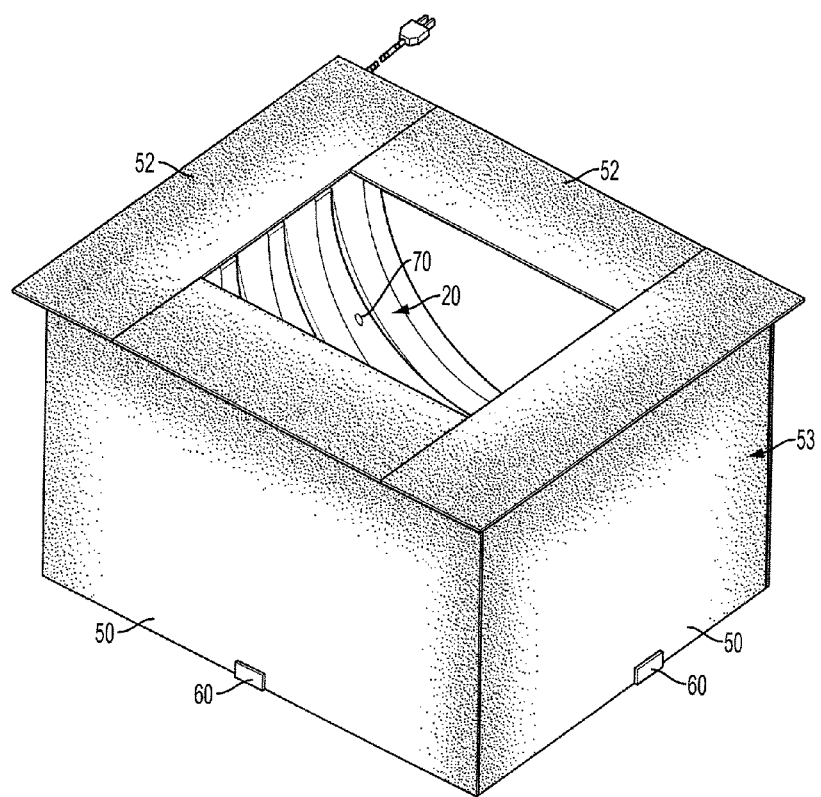
FIG. 5 is a perspective view of an empty assembled lighted planter unit formed from a single module.
Figure 8:
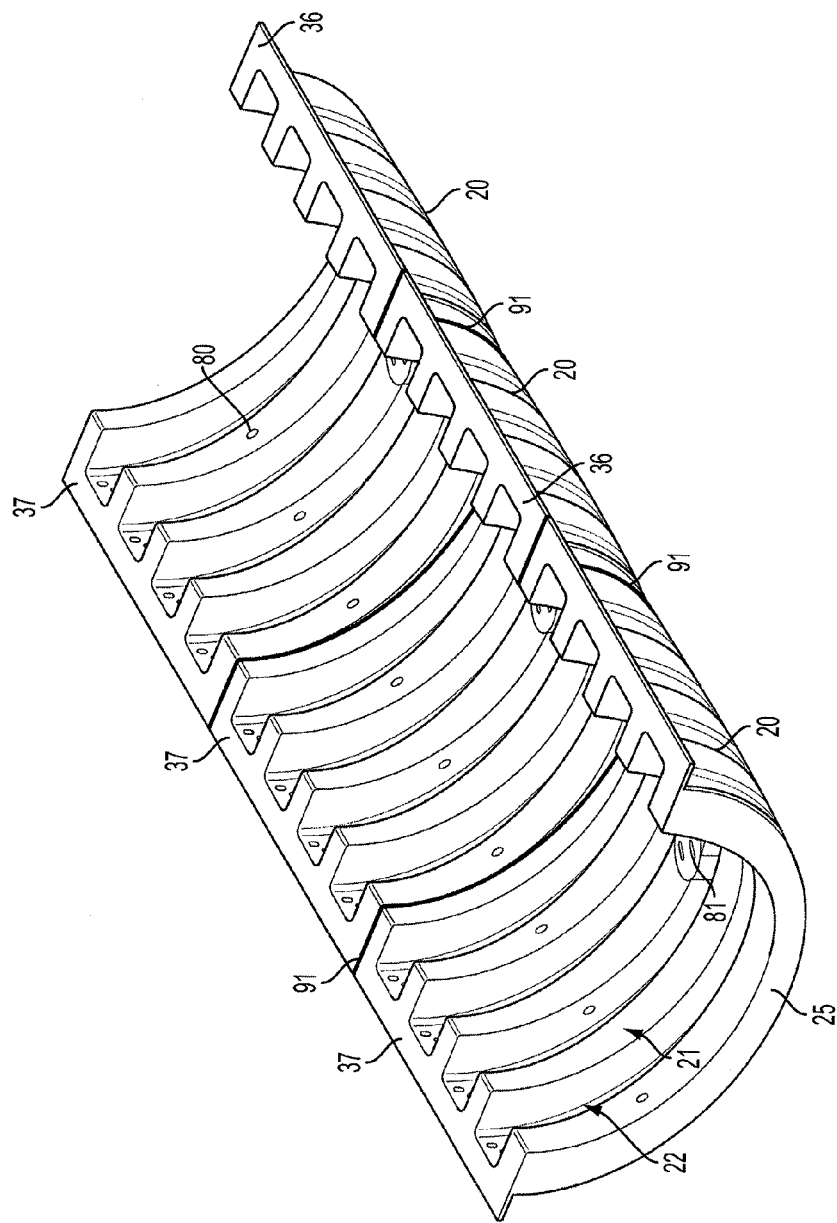
FIG. 8 is a perspective view of ganged sections of half-pipe shell as used to establish extra-long rectilinear planters.
Figure 9:
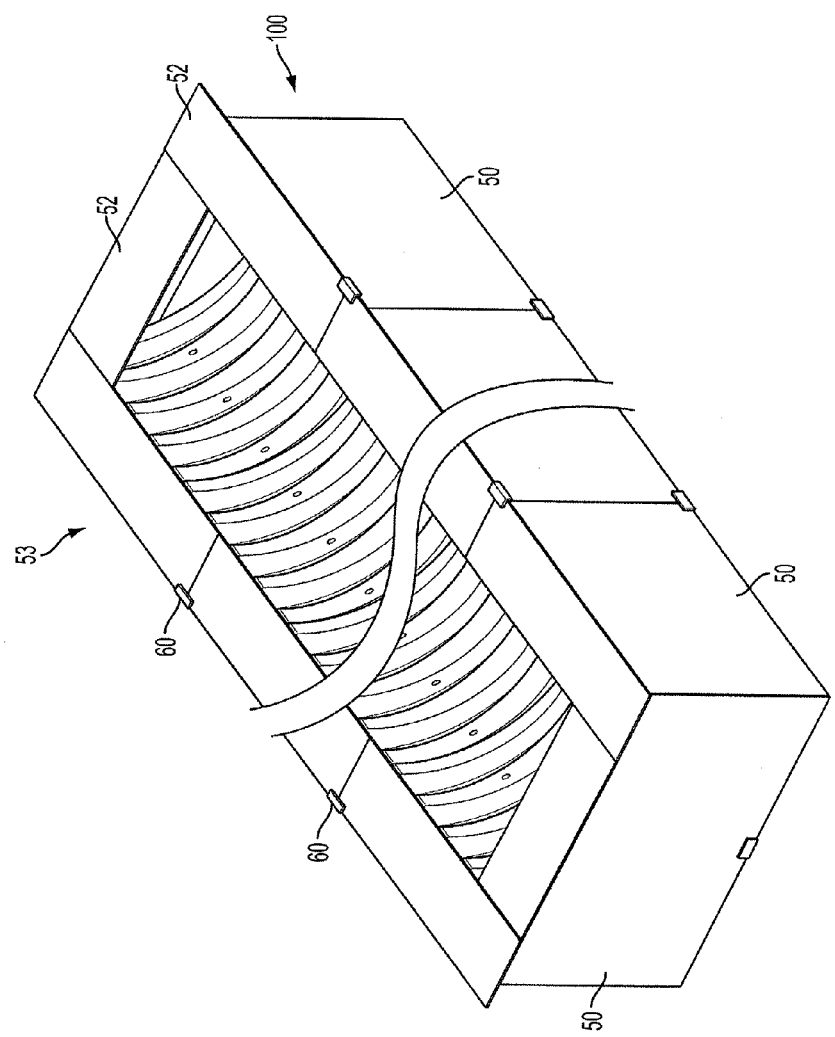
FIG. 9 is a schematic perspective view of a series of modular units ganged (ganged?) together to form a long rectilinear planter of length determined by the total number of interconnected modular units.
Figure 10:
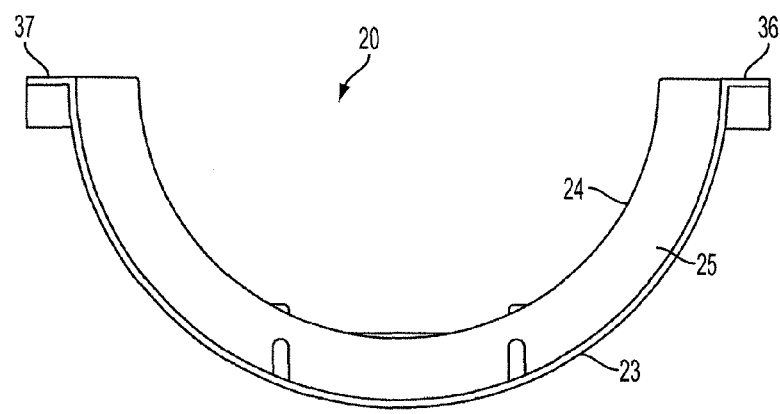
FIG. 10 is an end view of the half-pipe shell of the present invention.
Figure 11:
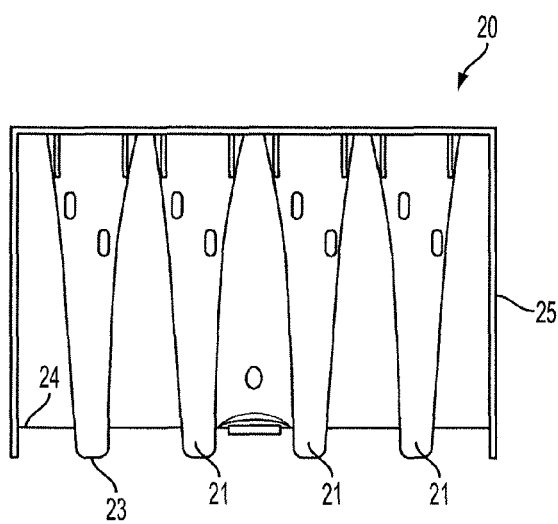
FIG. 11 is a side elevational view of the half-pipe shell of the present invention.
Figure 12:
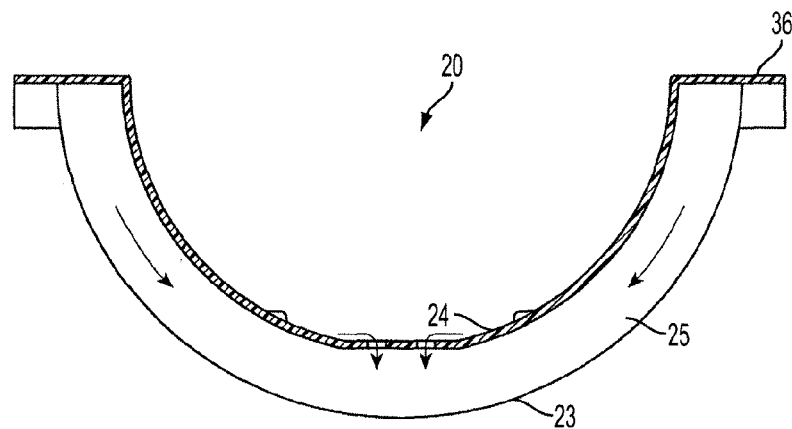
FIG. 12 is a cross-sectional view of the half-pipe shell of the present invention taken along lines 12-12 of FIG. 7.
Figure 13:
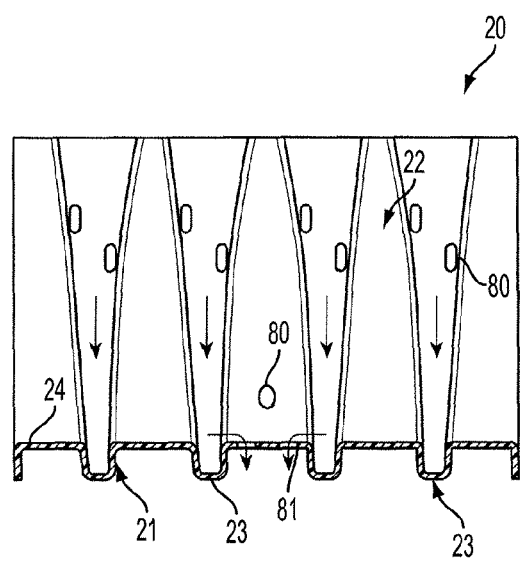
FIG. 13 is a cross-sectional view of the half-pipe shell of the invention taken along line 13-13 of FIG. 7.

The shells 20 include web portions 36, 37 which are fastened to the upper surfaces of the frame 10 by screws 38, 39 to complete an individual planter 40 as shown in FIG. 2, and comprising the fundamental elements of a module for creating extra-long "macro" linear planters 100 (FIG. 9) of lengths more than several hundred feet, each module comprised of a half-pipe shell 20 supported by a skeletal frame 10. The short planter 40 of FIG. 2 is exemplary of the fundamental elements found in the "macro" planter 100 of the invention comprised of a large series of frames 10 and shells 20 juxtaposed end-to-end as shown in FIGS. 8 and 9. The planters 40 and 100 are clad, in accordance with the invention, with vertical outer panels 50 of translucent plastic arranged in spaced relation with inner reflective or opaque panels 51 to form a circumscribing light box 53 closed at its top by horizontal translucent panels 52 (FIG. 5 and FIG. 9).

Figure 4:
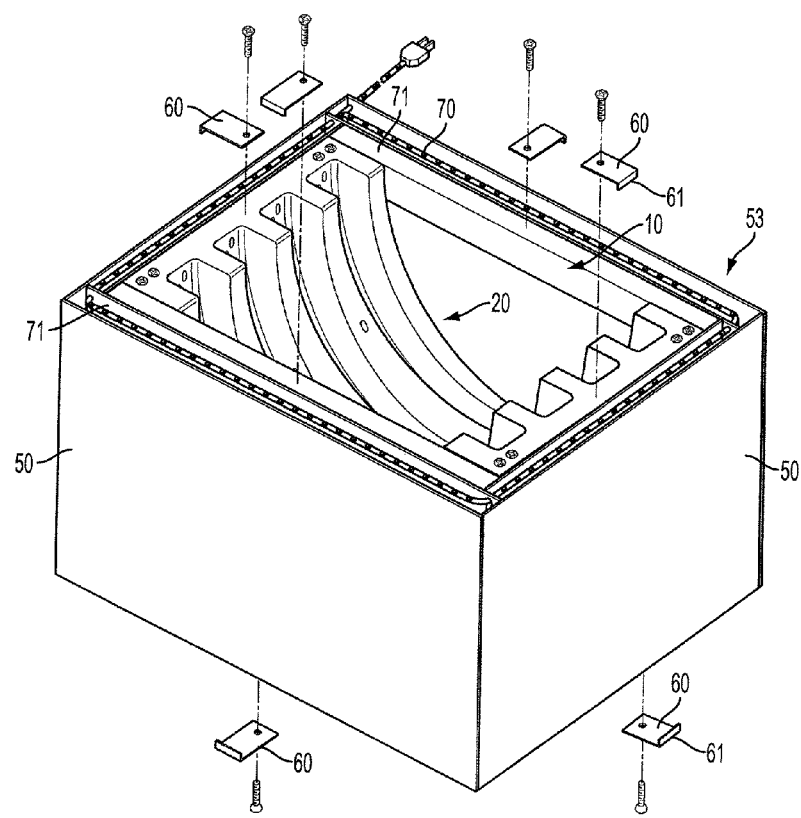
FIG. 4 is a perspective view of the planter of FIG. 3 including installed internal LED lighting strips and exploded views of the mounting hardware clips for securing the cladding walls.

More specifically, as shown in FIG. 4, upper and lower L-shaped clips 60 are fastened at their distal ends to the frame 10, the bent ends 61 of the clips engaging and securing the cladding panels 50, 51 to the frame 10. The translucent panels 52 are secured by epoxy cement (not shown) to the upper edges of the panels 50, 51. An LED lighting strip 70 is supported by mounting plates 71 internally of the light box 53 to light the exposed outer cladding panels of the planter. This interior LED lighting which may be multicolored and programmed to change periodically, provides special visual effects as will be appreciated. Moreover, the panels 52 may bear artwork or be stenciled to provide further visual effects and/or messaging for use in advertising applications or in traffic management applications.

Figure 6:
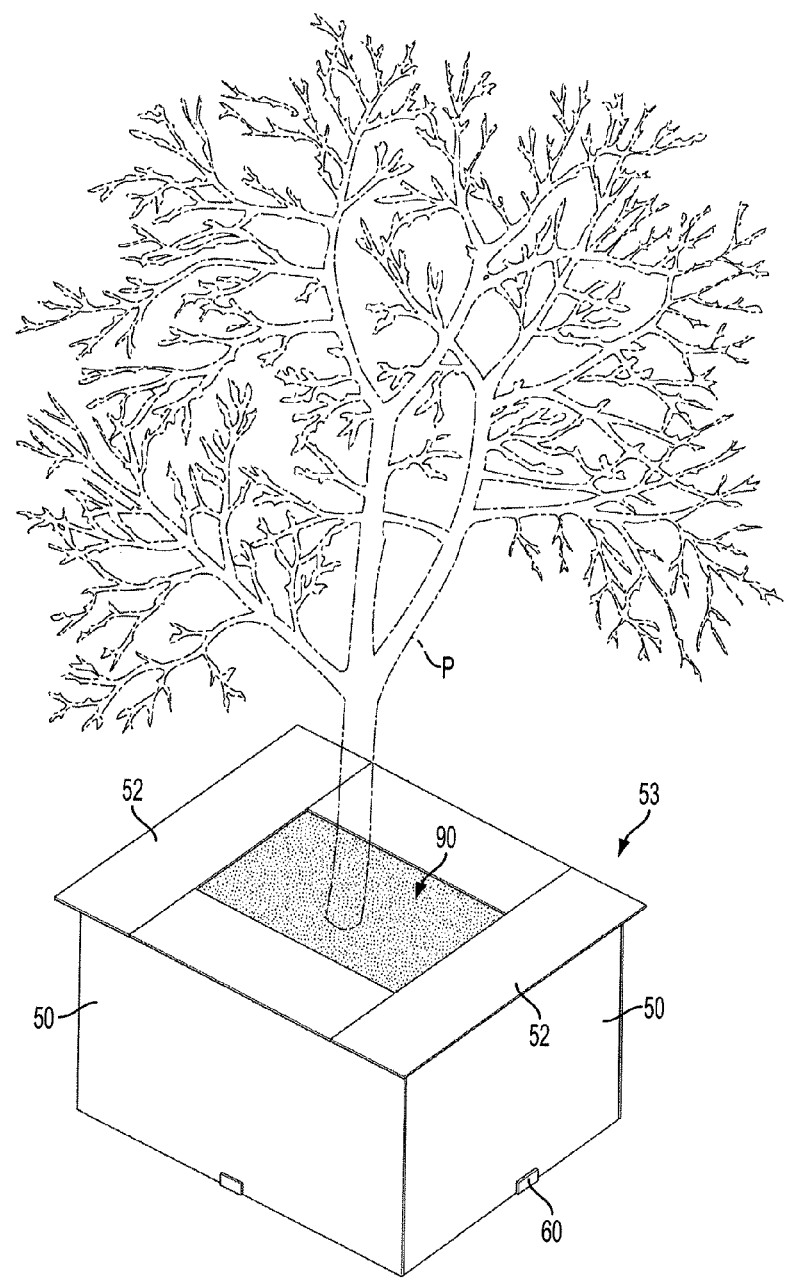
FIG. 6 is a perspective view of the unit of FIG. 5 filled with planting medium for supporting a tree.
Figure 7:
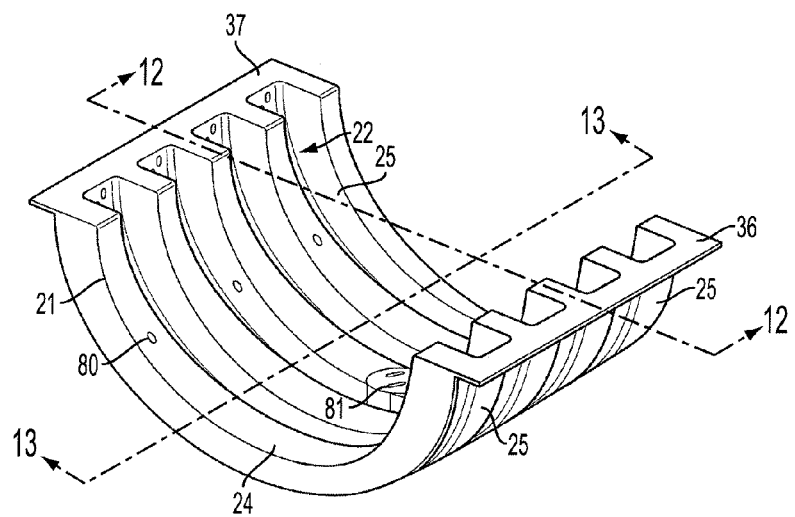
FIG. 7 is a perspective view of a single section of molded half-pipe shell.

As will be understood, the planters of the invention, whether formed as a single unit such as in FIGS. 1-5 or multiples ganged together in series such as shown in FIGS. 8 and 9 are filled with growing medium such as enriched soil 90 (FIG. 6 and FIG. 14) to support and to nurture growing plants P.

As a further specific aspect of the invention, the planter shells 20 are provided with a series of drainage ports 80 formed in the ribs 22 above the shell bottom to limit the amounts of water accumulation in the shells when the contained plants are irrigated. The number, location, and size of the ports 80 may be customized to suit the amount of moisture to be retained in the planters which is dictated by the requirements of flora to be grown in a particular planter. Bottom drainage ports 81 are also included as a control of the water accumulation during plant irrigation. While not shown, automatic irrigation piping may be readily incorporated into the macro planters by virtue of the open shells being arranged end-to-end. Water flow in the shells 20 is indicated by arrows in FIGS. 12 and 13.

Figure 14:
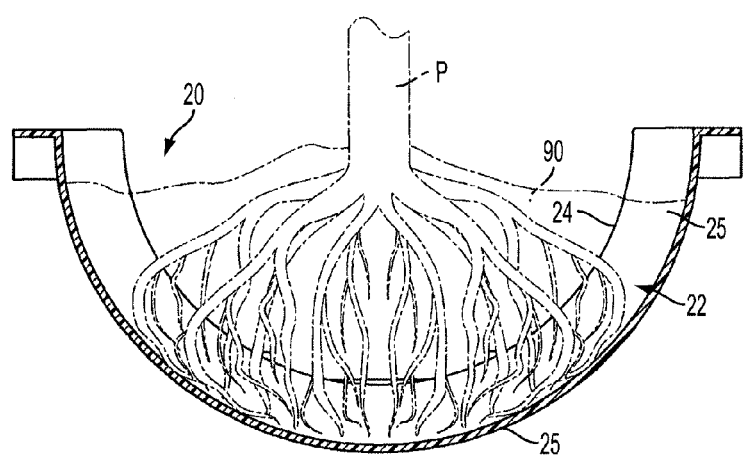
FIG. 14 is a cross-sectional view of the half-pipe shell of the invention.

As a particular advantage of the new planter, the troughs 22 and semi-circular shape thereof promote concentrated and healthy root growth as shown in FIG. 14. Moreover, the use of cylindrical half-pipe shells, rather than box-like soil containers, reduces the total weight of loaded planters by approximately one third and reduces the amount of growing medium and irrigation required for the planters which are rectangular parallelpiped in appearance ("coffin"-shaped) but internally semi-cylindrical in soil-holding, plant-retaining configuration.

As an important feature of the invention, new and improved lighted planters 100 (FIG. 9) of extra-long lengths may be assembled utilizing the fundamental building blocks of semi-cylindrical shells 20, skeletal parallelpiped frames 10, and wall panels 50, 51 secured to the frames 10 by simple clips 60. To produce a planter 100 of a length determined by the multiple of the number of shells employed, the shells 20 (supported in frames 10) are juxtaposed end-to-end as shown in FIG. 8, with congruent gaskets or gasket material 91 sandwiched between contiguous ends of the shells to establish tight joints. Skeletal frames 10 for the shells are formed from the frame elements shown in FIG. 1, with the posts, longitudinal, and transverse members specifically arranged to accommodate end-to-end juxtaposition of frames 10 to form a continuous support of the juxtaposed shells 20 therein. The juxtaposed abutted frames are secured to one another by screws or fasteners (not shown) in conventional fashion. The extra-long planters 100 are clad in the manner of the planter of FIG. 1 with exterior panels 50, 51 secured by clips 60 to the frames 10. With one or more LED strips 70 extending for the length of planter 100, the resulting visual display of lighted housing for hundreds of feet of plants is spectacular. While primarily intended as a support for a long line of plants, the macro planter 100, especially when lighted, may be used to create unique advertising or promotional displays when erected on rooftops. Alternatively, the planter units 100 may be used in highly trafficked (vehicular or pedestrian) areas to control flow while providing stunning visual effects, advertising and/or traffic information directions.

It should be understood, of course, that the specific form of the invention herein illustrated and described is intended to be representative only, as certain changes may be made therein without departing from the clear teachings of the disclosure. Accordingly, reference should be made to the following appended claims in determining the full scope of the invention.

I claim:

1. A modular structure unit for macro planter structures, said unit comprising
   (a) a rigid skeletal rectangular parallelpiped frame having four interconnected lower horizontal members defining a rectangular base, vertical post means at the corners of the rectangular base, and at least two upper horizontal members fastened to the vertical post means to rigidify the same;
   (b) a molded plastic half-pipe shell mounted on said frame, said half-pipe shell being generally semi-cylindrical in shape and having open ends adapted to be aligned with similar pipes on contiguous frames;
   (c) rectangular cladding wall panels affixed to said frame and adapted to be aligned in butted relation with similar cladding wall panels on contiguous wall panels on contiguous frames;

(d) whereby a series of units may be arranged and interconnected in longitudinal relation to establish a macro planter structure of substantial length.

2. The modular unit of claim 1, in which
(a) said half-pipe shell is of corrugated construction including alternating semi-circular ribs and troughs.

3. The modular unit of claim 2, in which
(a) drainage ports are formed in said ribs in spaced relation to the centers of said semi-circular ribs.

4. The modular unit of claim 1, in which
(a) clip means attached to said frame removably mount said cladding panels to said frame.

5. The modular unit of claim 4, in which
(a) said cladding panels comprise spaced pairs of interior and exterior panels, the exterior panels are translucent, the interior panels are highly reflective;
(b) an LED light source is mounted between said spaced pairs of panels.

6. The modular unit of claim 5, in which
(a) translucent top panel means are mounted at the upper edges of said cladding panels to establish a light chamber.

7. The modular unit of claim 1, in which
(a) end cladding panels are secured to said unit to establish a rectangular parallelpiped planter structure.

8. An extra-long macro planter structure comprised of a series of juxtaposed modular planter units, each planter unit including
(a) a rigid skeletal rectangular parallelpiped frame having four interconnected lower horizontal members defining a rectangular base, vertical post means at the corners of the rectangular base, and at least two upper horizontal members fastened to the vertical post means to rigidify the same;
(b) a molded plastic half-pipe shell mounted on said frame, said half-pipe shell being generally semi-cylindrical in shape and having open ends adapted to be aligned with similar pipes on contiguous frames; and
(c) rectangular cladding wall panels affixed to said frame and adapted to be aligned in butted relation with similar cladding wall panels on contiguous wall panels on contiguous frames.

9. The macro planter of claim 8, in which
(a) said half-pipe shell is of corrugated construction including alternating semi-circular ribs and troughs.

10. The macro planter of claim 9, in which
(a) drainage ports are formed in said ribs in spaced relation to the centers of said semi-circular ribs.

11. The macro planter of claim 8, in which
(a) clip means attached to said frame removably mount said cladding panels to said frame.

12. The macro planter of claim 11, in which
(a) said cladding panels comprise spaced pairs of interior and exterior panels, the exterior panels are translucent, the interior panels are highly reflective;
(b) an LED light source is mounted between said spaced pairs of panels.

13. The macro planter of claim 12, in which
(a) translucent top panel means are mounted at the upper edges of said cladding panels to establish a light chamber.

14. The macro planter of claim 8, in which
(a) end cladding panels are secured to said unit to establish a rectangular parallelpiped planter structure.

\* \* \* \* \*